United States Patent
Astle (10) Patent No.: US 10,131,553 B2
(45) Date of Patent: Nov. 20, 2018

(54) ELECTROCHEMICAL CELLS FOR SUPPLY OF ACID WATER

(71) Applicant: 3M INNOVATIVE PROPERTIES COMPANY, St. Paul, MN (US)

(72) Inventor: Robert E. Astle, Middlefield, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 648 days.

(21) Appl. No.: 14/648,808

(22) PCT Filed: Jan. 30, 2014

(86) PCT No.: PCT/US2014/013752
§ 371 (c)(1),
(2) Date: Jun. 1, 2015

(87) PCT Pub. No.: WO2014/120871
PCT Pub. Date: Aug. 7, 2014

(65) Prior Publication Data
US 2015/0315038 A1    Nov. 5, 2015

Related U.S. Application Data

(60) Provisional application No. 61/758,467, filed on Jan. 30, 2013.

(51) Int. Cl.
*C02F 1/42*        (2006.01)
*C25B 15/08*     (2006.01)
(Continued)

(52) U.S. Cl.
CPC .............. *C02F 1/42* (2013.01); *C02F 1/4618* (2013.01); *C02F 1/4695* (2013.01); *C25B 9/10* (2013.01); *C25B 15/08* (2013.01); *C02F 1/4602* (2013.01); *C02F 2001/46185* (2013.01); *C02F 2201/46105* (2013.01)

(58) Field of Classification Search
CPC .......... C02F 1/4674; C02F 2001/46138; C02F 2201/4613; C02F 2201/4614; C02F 2201/4615; C02F 2201/46125; C02F 2209/005; C02F 2209/29; C02F 2303/20
See application file for complete search history.

(56) References Cited

U.S. PATENT DOCUMENTS 5,954,935 A    9/1999 Neumeister
6,056,878 A *  5/2000 Tessier ................... B01D 61/48
                                                          204/524

(Continued)

FOREIGN PATENT DOCUMENTS

JP    2006-043549    2/2006
WO   WO 2013/019765   2/2013
WO   WO 2014/120876   8/2014

*Primary Examiner* — Walter D. Griffin
*Assistant Examiner* — Cameron J Allen
(74) *Attorney, Agent, or Firm* — Scott A. Baum (57) ABSTRACT

Provided are water treatment systems where acid water from electrochemical devices are provided to waste streams of ion reduction devices. Specifically, electro-chemical cells having strong acid cation resins are operated to produce acid water that is supplied to the waste stream of an aqueous separation unit, for example an ion reduction device that includes, but it not limited to: deionization systems, continuous or batch-wise, and reverse-osmosis systems.

23 Claims, 6 Drawing Sheets

(51) Int. Cl.
  *C25B 9/10* (2006.01)
  *C02F 1/461* (2006.01)
  *C02F 1/469* (2006.01)
  *C02F 1/46* (2006.01)

(56) References Cited

U.S. PATENT DOCUMENTS

| | | |
|---|---|---|
| 6,296,751 B1 | 10/2001 | Mir |
| 6,495,014 B1 | 12/2002 | Datta |
| 7,083,733 B2 | 8/2006 | Freydina |
| 7,329,358 B2 | 2/2008 | Wilkins |
| 7,563,351 B2 | 7/2009 | Wilkins |
| 7,582,198 B2 | 9/2009 | Wilkins |
| 7,604,725 B2 | 10/2009 | Ganzi |
| 7,846,340 B2 | 12/2010 | Freydina |
| 7,862,700 B2 | 1/2011 | Wilkins |
| 2002/0144911 A1 | 10/2002 | Cornel |
| 2005/0103622 A1 | 5/2005 | Jha |
| 2005/0103717 A1 | 5/2005 | Jha |
| 2006/0157422 A1 | 7/2006 | Freydina |
| 2007/0051684 A1 | 3/2007 | Grebenyuk |
| 2008/0289371 A1 | 11/2008 | Hahm et al. |
| 2009/0236235 A1 | 9/2009 | Wilkins |
| 2010/0147704 A1 | 6/2010 | Xiong |
| 2011/0168567 A1 | 7/2011 | Smith |
| 2012/0160769 A1* | 6/2012 | Sui .................. C02F 1/4618 210/636 |

* cited by examiner

ELECTROCHEMICAL CELLS FOR SUPPLY OF ACID WATER

FIELD

The present invention relates to the field of electrochemical cells for supplying acid water and processes for using the same, and, more particularly, to the field of electrochemical cells that are rechargeable and that minimize scale build-up, which are useful for supplying waste streams of ion reduction devices with acid water for flushing ions and reducing scale in ion concentration compartments.

BACKGROUND

Salts dissolved in freshwater sources, measured as water hardness or total dissolved solids (TDS), can create problems in industrial, commercial, and residential uses of water, and processes to remove these salts have long been practiced. As human freshwater use intensifies, our water sources are becoming increasingly saline due to a variety of causes: agricultural runoff; urban runoff containing road salt; overpumping of groundwater leading to intrusion of seawater into aquifers; and exploitation of brackish water sources not previously considered for human use. Thus, the demand for TDS reduction is expected to increase into the future, and new technologies will be required to improve the efficiency and environmental sustainability of TDS reduction processes.

Water purification devices used to remove such salts include ion reduction devices such as deionization systems, continuous or batch-wise, and reverse-osmosis systems. The compartments of such devices used to collect or concentrate salt ions must be cleaned, flushed, and/or maintained on a regular basis to avoid fouling and scale build-up. Often, acids and/or acid water are used for such steps. Supply of acids and/or acid water can be costly, particularly when large beds of resin are used such that resin requires off-site regeneration and/or use of strong acids. There is an ongoing need to improve the way devices that collect or concentration salt ions are cleaned, flushed, and/or maintained.

SUMMARY

Provided are water treatment systems where acid water from electrochemical devices are provided to waste streams of ion reduction devices.

In a first aspect, a water treatment system comprises: an ion reduction device and an electrochemical cell in fluid communication with a waste stream of the ion reduction device, the electrochemical device supplying acid water to the waste stream to flush ions from an ion concentration compartment of the ion reduction device.

In one or more embodiments, the ion reduction device further comprises: an inlet stream, an outlet stream; and a plurality of compartments each separated by an ion-permeable membrane, wherein each compartment comprises one or more deionized liquid compartments that receive the inlet stream and supply the outlet stream and one or more ion concentration compartments that are in fluid communication with the waste stream; and the electrochemical cell has a service mode and a recharge mode, the electrochemical cell comprising: a first product compartment containing a strong acid cation resin; a first catholyte compartment and a first anolyte compartment; a cation-permeable membrane and a bipolar membrane; and a first cathode adjacent to the first catholyte compartment and an anode adjacent to the first anolyte compartment; wherein during the service mode, water that is acidic flows from the product compartment into the waste stream of the ion reduction device.

In an embodiment, the waste stream comprises a recycle loop and a slip stream.

In another embodiment, the acidic water has a pH that is sufficient to reduce scale and/or prevent precipitation of salts in the one or more ion concentration compartments. Suitable pH values are typically those less than approximately 5, or even 3 or lower.

The electrochemical cell can be operated batch-wise and during the service mode no current density is applied to the electrochemical cell and during the recharge mode a current density is applied to the electrochemical cell. In a detailed embodiment, the current density is a low current density effective to substantially keep dissolved ions in solution in regions adjacent to the surfaces of the cation-permeable and bipolar membranes during the recharge mode.

The electrochemical cell can comprise two or more product compartments being separated by one or more concentrate compartments and containing strong cation resins, each product compartment bounded by a pair of cation-permeable and bipolar membranes.

The electrochemical cell can further comprise: a second product compartment comprising a strong cation resin; a second cathode adjacent to a second catholyte compartment that is adjacent to the second product compartment and a second anolyte compartment that is adjacent to the anode.

A detailed aspect provides a multi-paired electrochemical cell comprising: two or more product compartments containing one or more ion-exchange resins; a catholyte compartment and an anolyte compartment; two or more pairs of a bipolar membrane and a cation-permeable membrane; a cathode and an anode.

In a detailed embodiment, the electrochemical cell further comprises a scale inhibition device. One embodiment provides that the scale inhibition device comprises a control system for applying the low current density to the electrochemical cell, for pulsing the low current density to the electrochemical cell, or both. Another embodiment provides that the scale inhibition device comprises one or more fluid conveyance layers. The surfaces of the one or more fluid conveyance layers can comprise non-smooth surface features.

Another aspect provides methods of treating water comprising: operating an ion reduction device, flowing water through an electrochemical cell to produce acid water, supplying the acid water to a waste stream of the ion reduction device to flush ions from an ion concentration compartment of the ion reduction device. Methods can include reducing scale and/or preventing precipitation of salts in the one or more ion concentration compartments.

In an embodiment, the step of providing the acid water to the waste stream occurs at intervals based on time, quality of the waste stream, or combinations thereof. In other embodiments, the methods further comprise ceasing supplying the acid water to the waste stream at intervals based on time, quality of the waste stream, or combinations thereof. In a detailed embodiment, the quality of the waste stream comprises conductivity, pH, total dissolved solids, LSI (Langelier Saturation Index), temperature, or combinations thereof.

One or more embodiments provide that during the service mode where no current density is applied to the electrochemical cell, the water passes through the first product compartment and contacts the strong acid cation resin, exiting the first product compartment in an acidic form; and wherein during the recharge mode where the current density is applied to the electrochemical cell, a concentrate stream enters the first catholyte and the first anolyte compartments and contacts the cation-permeable and the bipolar membranes, exiting first catholyte and the first anolyte compartments with an increased amount of ions as compared to when the concentrate stream entered the first catholyte and the first anolyte compartments, and after the recharge mode, the strong acid cation resin has fewer ions as compared to when the recharge mode started.

In an embodiment, the electrochemical cell comprises two or more product compartments being separated by one or more concentrate compartments and containing strong cation resins, each product compartment bounded by a pair of cation-permeable and bipolar membranes; wherein during the service mode where no current density is applied to the electrochemical cell, the water passes through the two or more product compartments and contacts the strong acid cation resins, exiting the product compartments in an acidic form; and wherein during the recharge mode where the current density is applied to the electrochemical cell, a concentrate stream enters the first catholyte, the first anolyte compartment, and the one or more concentrate compartments and contacts the cation-permeable membranes and the bipolar membranes, exiting first catholyte, the first anolyte, and the one or more concentrate compartments with an increased amount of ions as compared to when the concentrate stream entered the first catholyte, the first anolyte, and the one or more concentrate compartments, and after the recharge mode, the strong acid cation resins have fewer ions as compared to when the recharge mode started.

The methods herein can exclude the use of chemical additions to the electrochemical cell.

BRIEF DESCRIPTION OF THE DRAWINGS

The accompanying drawings are included to provide a further understanding of the invention described herein and are incorporated in and constitute a part of this specification. The drawings illustrate exemplary embodiments. Certain features may be better understood by reference to the following detailed description when considered in connection with the accompanying drawings, in which like reference numerals designate like parts throughout the figures thereof, and wherein.

The figures are not necessarily to scale. Like numbers used in the figures refer to like components. It will be understood, however, that the use of a number to refer to a component in a given figure is not intended to limit the component in another figure labeled with the same number.

DETAILED DESCRIPTION

Provided are water treatment systems where acid water from electrochemical devices is provided to waste streams of ion reduction devices. That is, electrochemical cells are operated to produce acid water that is supplied to the waste stream of an aqueous separation unit, for example an ion reduction device. By periodically running the waste stream enhanced with acid water through the separation unit, hardness cations would be removed, and the pH would be lowered substantially, resulting in a much lower Langelier Saturation Index (LSI) value. With a lower LSI value, the overall aqueous separation unit could be operated at a higher water recovery rate. The use of an electrochemical cell to provide acid water to an aqueous separation unit eliminates the need for the use of a strong acid action resin ion exchange tank for providing acid water, where such an ion exchange tank requires frequent change out of the entire tank and use of strong acids for regeneration. Operating costs are lowered due to the reduced service needed for the ion exchange tank. Use of the electrochemical cell would allow for more frequent low pH flushing of the ions out of the aqueous separation unit, which prevents precipitation of calcium carbonate ($CaCO_3$) and build-up of scale. Desirable electrochemical cells are disclosed in PCT/US2012/048922, which is incorporated herein by reference.

Reference to "ion reduction device" means a device that removes ions from a fluid source such as water. Exemplary ion reduction devices include but are not limited to deionization systems, continuous or batch-wise, and reverse-osmosis systems. An exemplary device is a Continuous Electrodeionization (CEDI) unit.

Reference to "ion exchange membrane" or "ion permeable membrane" means a membrane that selectively allows one type of ion to pass through while prevent other ions from passing through. Thus, a cation-permeable membrane allows cations, not anions, to cross, and, likewise, an anion-permeable membrane allows anions, not cations, to cross. A bipolar membrane is a structure that combines both a cation-permeable membrane and an anion-permeable membrane. Ion permeable membranes are known to those skilled in the art, and choice of such is based on environment of use and operating conditions. An exemplary cation-permeable membrane is sold under the trade name ResinTech CMB-SS, and an exemplary anion-permeable membrane is sold under the trade name ResinTech AMB-SS. An exemplary bipolar membrane is sold under the trade name NEOSEPTA BP-IE.

A "product compartment" is the part of the cell that holds resin for a desired treatment whose inlet receives incoming water to be treated and whose outlet provides treated water. A "concentrate compartment" is the part of the cell that receives and accumulates waste ions from the product compartment. The catholyte compartment is the part of the cell next to the cathode, and the anolyte compartment is the part of the cell next to the anode. In addition, for the use of multiple cell pairs, that is, pairs of desired membranes (e.g., a cation-permeable and bipolar membrane used together or an anion-permeable membrane and a bipolar membrane used together), any compartments between the pairs that are not product compartments will be concentrate compartments for collecting waste ions.

By "current density" it is meant an amount of electrical current per unit area of cross section of the electrochemical cell. The choice of current density is one that is based on ensuring dissolved ions substantially remain in solution and do not precipitate out onto the ion exchange membranes for a given cell size/application. A desired current density can be chosen based on the expected duration of the recharge cycle. Low current densities can be used to provide the minimum amount of energy possible to ensure regeneration over a period time.

Electrochemical cells provided herein can further comprise a scale inhibition device, which is a device that discourages, directly or indirectly, adherence or deposition of ions on ion exchange membranes such as cation-permeable membranes or bipolar membranes and/or on electrodes, e.g., anode and cathode. In one or more embodiments, the scale inhibition device comprises a control system for applying the low current density to the electrochemical cell, for pulsing the low current density to the electrochemical cell, or both. The pulsing can occur for a duration of time in the range of 1 milliseconds (mS) to 1 second (S), or even in the range of 10-100 mS. The pulsing can be applied at intervals of time of every 1 millisecond to 1 second, or even 10-500 mS.

Other scale inhibition devices can be one or more fluid conveyance layers. The surfaces of the one or more fluid conveyance layers can comprise non-smooth surface features such as channels. A "fluid conveyance layer" is a membrane or otherwise permeable structure effective to inhibit substantially accumulation of deposits thereon as well as on the ion exchange membranes. One or more embodiments provide that the surfaces of the fluid conveyance layers comprise non-smooth surface features. Such features improve fluid transfer by reducing the boundary layer. For example, the non-smooth surface features can comprise channels.

Reference to "service mode" of the electrochemical cell means the duration when incoming water to be purified enters the product compartment(s) of the cell and acid water leaves the product compartment(s). During the service mode according to embodiments provided herein, there is no current flowing to the cell.

Reference to "recharge mode" of the electrochemical cell means the duration when no water is being purified in the product compartment, a waste stream is supplied to the concentrate compartment(s), current is supplied to the cell, and the ion exchange resin is regenerated.

Before describing several exemplary embodiments of the invention, it is to be understood that the invention is not limited to the details of construction or process steps set forth in the following description. The invention is capable of other embodiments and of being practiced or being carried out in various ways.

Figure 1:
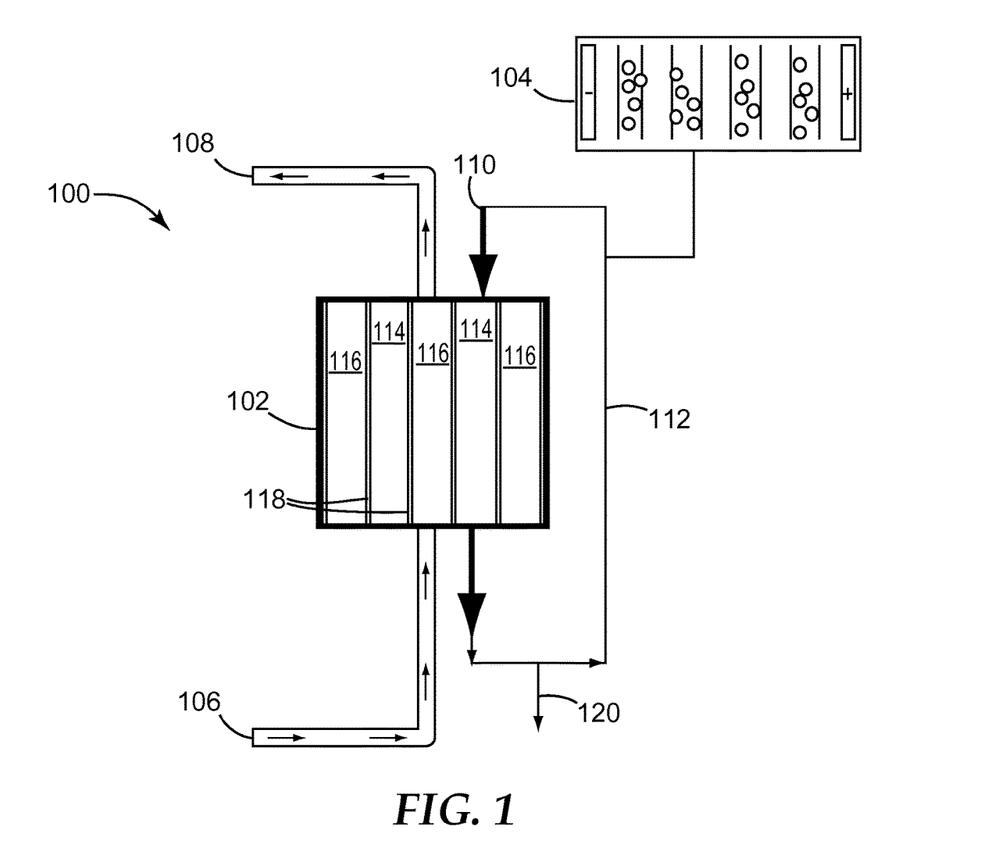
FIG. 1 is a schematic drawing of a water treatment system.

Turning to the figures, FIG. 1 shows a water treatment system 100 having an ion reduction device 102 and an electrochemical cell 104, where the electrochemical cell is in fluid communication with a waste stream 110, that has a slip stream 120 to drain waste water, and an optional recycle loop 112. The ion reduction device can be any used in the art. For example, those devices having at least one ion permeable membrane 118 separating one or more compartments may be desirable. The devices can have one or more deionized liquid compartments 116 and one or more ion concentration compartments 114. The ion reduction device 102 has an inlet stream 106 and an outlet stream 108, flowing through one or more deionized liquid compartments 116, where the outlet stream 108 has fewer ions than the inlet stream 106. The ions from the inlet stream 106 are accumulated in the ion concentration compartment(s) 114 and flushed with the waste stream having acid water supplied from the electrochemical cell 104.

Figure 2:
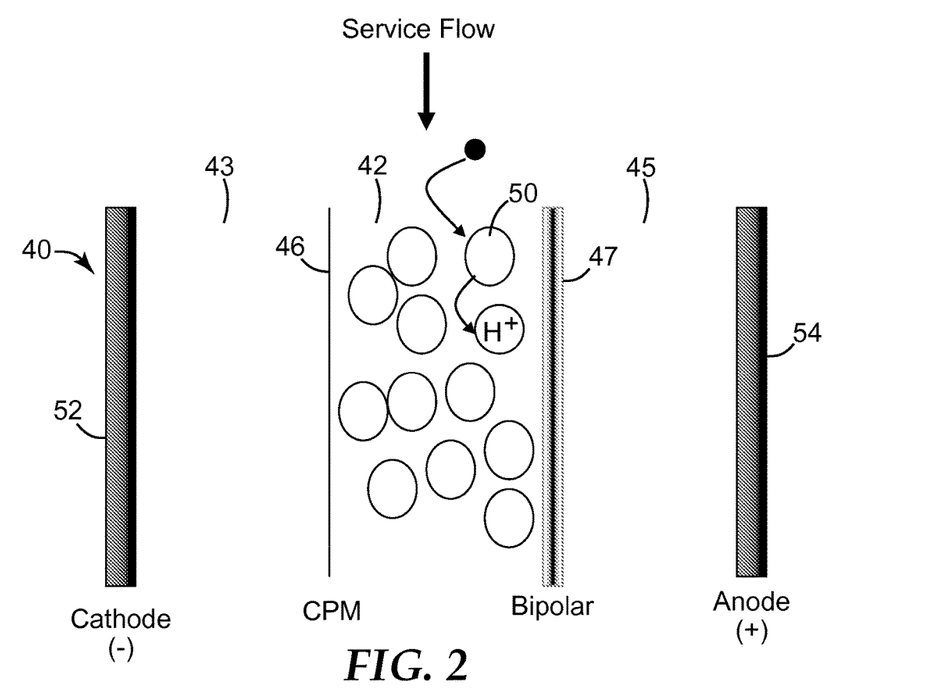
FIG. 2 is a schematic drawing of an embodiment of an electrochemical cell showing direction of service flow of a product stream (for example, tap water) through a bed of cation resin.
Figure 3:
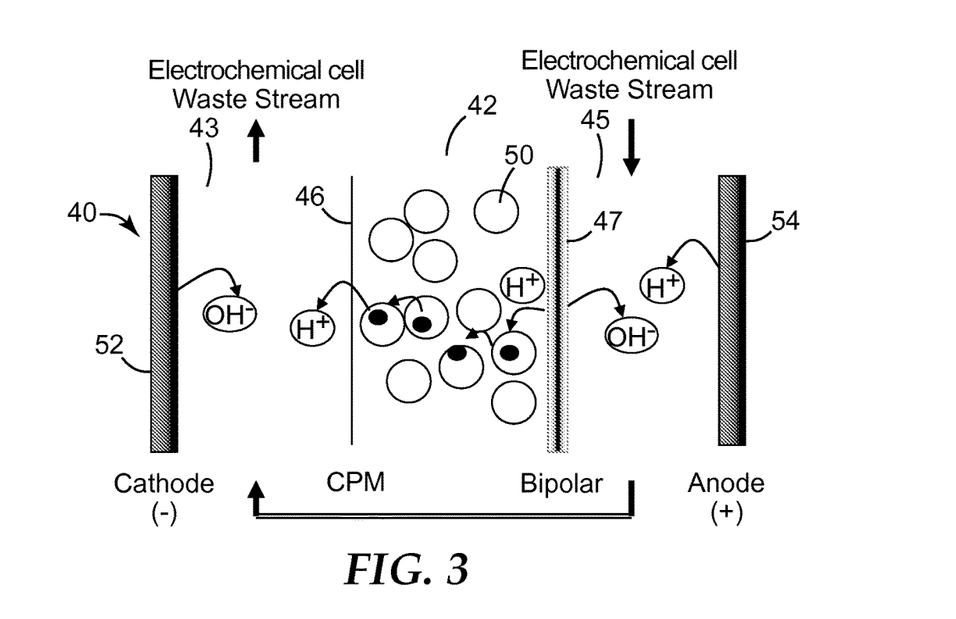
FIG. 3 is a schematic drawing of the embodiment of FIG. 2 showing the direction of flow of a waste stream that accumulates waste during regeneration of the cation resin.
Figure 4:
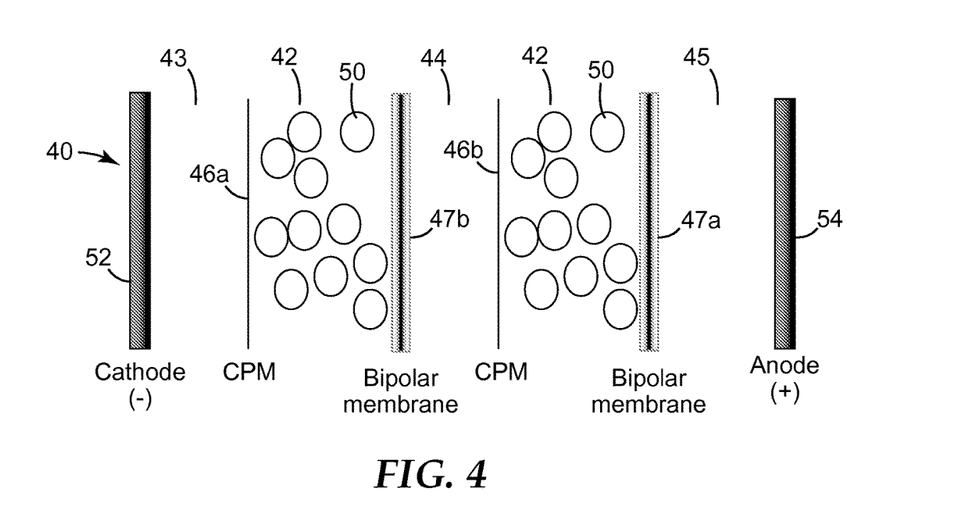
FIG. 4 is a schematic drawing the embodiment of FIG. 2 showing an embodiment having multiple product compartments in parallel.

FIGS. 2, 3, and 4 depict an electrochemical cell in accordance with one embodiment. Such a cell can be used with a single product compartment or with multiple product/concentrate compartments between the electrodes. In FIG. 2, service flow (incoming water such as tap water) is shown during a service mode when no current is applied to the electrochemical cell and depicting an electrochemical cell 40 that comprises a bed of strong cation resin in the hydrogen form 50 in a product compartment 42 that is bound on one side by a cation-permeable membrane (CPM) 46, and on the other side by a bipolar membrane 47. An anolyte compartment 45 that contains no resin is bound on one side by an anode 54 and on the other by the bipolar membrane 47. A catholyte compartment 43 that also contains no resin is bound on one side by a cathode 52 and on the other by the CPM 46. During the service mode, the water flows through the product compartment 42, where ions are removed by ion exchange. Specifically, cations bind to the cation exchange resin, displacing H. Strong cation exchange resins are known in the art, with exemplary resins being those sold under the trade name DOWEX™ MARATHON™ C, which are resins having a styrene-divinylbenzene (DVB) gel matrix. During the service mode, substantially to completely all of the cations in passing through the cell are exchanged for hydrogen ions. So, the water exiting the cell at the other end of the product compartment (not shown) has an acidic pH, thereby forming acid water. Flow of the water depends on the needs of the application, but generally there should be sufficient contact time to achieve substantial exchange of cations by the ion exchange resin. Demand for the acid water for entry into the waste stream of the ion reduction device can be based on many factors, including, but not limited to volume treated through the ion reduction device, time, conductivity of the waste stream, rate of ions into the waste stream, parameters affecting LSI such as hardness, alkalinity, TDS, pH, and temperature, or any other indicator that ions of the ion concentrate compartment need to be flushed. It is noted that conductivity is a direct measure of total ion content in the waste stream.

The end of the service mode may be defined by the product water demand of the application, or by the time at which the resin is nearing exhaustion. Exhaustion of the resin can be determined, for example, by monitoring the conductivity of the outlet/acid water. Under the circumstances of producing acid water from a strong acid cation resin bed, conductivity decreases as the resin bed becomes exhausted as the hydrogen ion content decreases. In addition, exhaustion of the resin may be predicted based on volume of water treated based on, for example, information regarding the ion content of the income source (tap) water.

FIG. 3 is the device of FIG. 2 showing electrochemical cell (EC) waste stream flow during a recharge mode, where the EC waste stream enters, for example, the anolyte compartment 45. It is noted that in other configurations, the EC can enter the catholyte compartment 43 and flow in the opposite direction. The EC waste stream exits the cell through the catholyte compartment 43, passing by the cathode. The EC waste stream is not exposed to resin in the concentrate compartment. Moreover, as desired, the EC waste stream can flow through one or each compartment in parallel and then feed into a drain. Upon application of a current density to the electrodes, the cations captured by the resin are replaced by $H^+$ ions generated by electrolysis and by $H^+$ ions generated by hydrolysis at the bipolar membrane and now migrate towards the cathode through the CPM. The EC waste stream receives the ions. Upon exiting the cell, the EC waste stream contains a higher amount of ions associated with alkalinity/TDS as compared to when it entered to cell. The cation resin is accordingly returned back to its acid form. Flow of the EC waste stream depends on the needs of the application, but generally the EC waste stream flow rate should be controlled in such a way as to maintain a low concentration of dissolved ions in the boundary layers adjacent to the selectively ion permeable membranes, keeping those concentrations below the concentrations at which dissolved salts might precipitate, while minimizing water use. The end of the recharge mode may be simply when demand for the acid water resumes or when the resins are substantially returned to their acid and base forms. The electrical regeneration eliminates a need for chemical regeneration with a strong acid. The electrochemical cell can be regenerated as needed and can be coordinated with the regeneration of the ion reduction device. The electrochemical cell can be used to depletion or to only partial depletion and regenerated during the recharge mode accordingly.

In FIG. 4, one embodiment having multiple compartments in parallel is shown. The electrochemical cell 40 comprises multiple beds of strong cation resin 50 in multiple product compartments 42 that are bound by cation-permeable membranes (CPM) 46a and 46b, and by bipolar membranes 47b and 47a. The anolyte compartment 45, the catholyte compartment 43, and one or more concentrate compartments 44 that contain no resin are bound by structures of the cell. That is, the outer concentrate compartments referred to as the anolyte compartment 45 and the catholyte compartment 43 are bound on one side by an anode 54 and on the other by a cathode 52, respectively. The inner concentrate compartment 44 is bound by the bipolar membrane 47b and cation-permeable membrane 46b.

Figure 5:
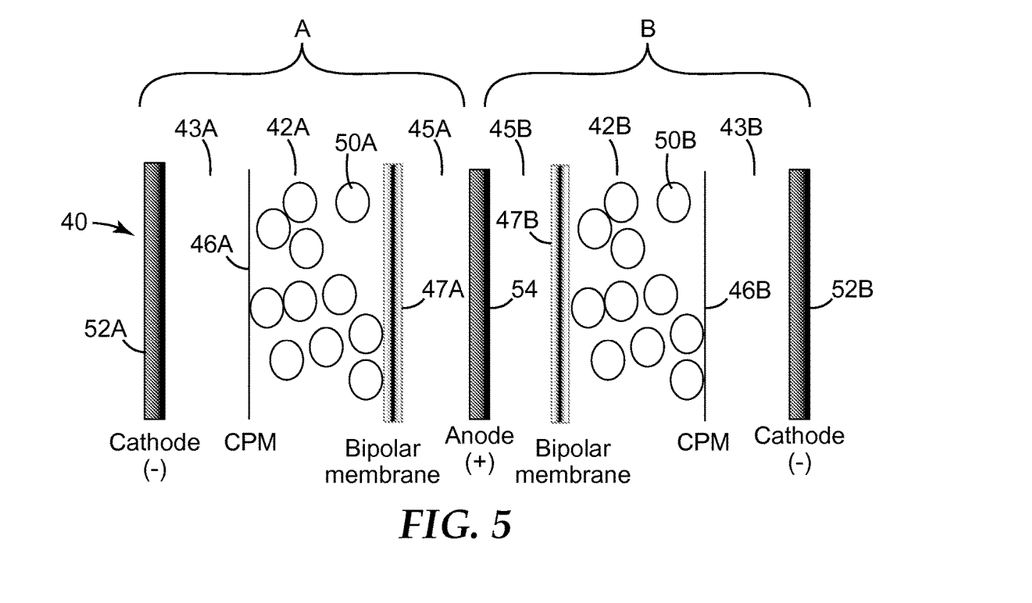
FIG. 5 is a schematic drawing of the embodiment of FIG. 2 showing another embodiment having multiple product compartments in parallel.

In FIG. 5, another one embodiment having multiple compartments in parallel is shown. In this embodiment, one anode 54 is provided. Operation can be conducted through one side of the electrochemical cell 40, e.g., side "A," where the cell operates as discussed above using anode 54 and cathode 52A. The strong cation resin 50A in product compartment 42A is bound by a cation-permeable membrane (CPM) 46A and a bipolar membrane 47A. The first anolyte compartment 45A and the first catholyte compartment 43A contain no resin. Once maintenance and/or regeneration is needed on side "A" to, for example, recharge the resin and/or change out the resin and/or replace the cathode and/or replace either membrane, side "B" can be put into service using anode 54 and cathode 52B. The anode can be an expensive component, made from, for example, a noble metal, that can replaced less frequently than the other components of the cell and can be used for both sides in the embodiment of FIG. 5. With respect to side "B," the strong cation resin 50B in product compartment 42B is bound by a cation-permeable membrane (CPM) 46B and a bipolar membrane 47B. The first anolyte compartment 45A and first catholyte compartment 43A contain no resin. Both sides "A" and "B" can comprise further product and/or concentrate compartments (not shown).

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

The following abbreviations are used to describe the examples:

A: amp
cm: centimeter
C: Coulomb
gpg: grains per gallon
gpm: gallons per minute
in: inches
K: Conductivity
LSI: Langelier Saturation Index
µS: microsiemens
mA: milliamp
mg: milligram
$cm^2$: square centimeter
ppm: parts per million
V: Volt Example 1

Strong Acid Cation Bipolar Cell

Figure 6:
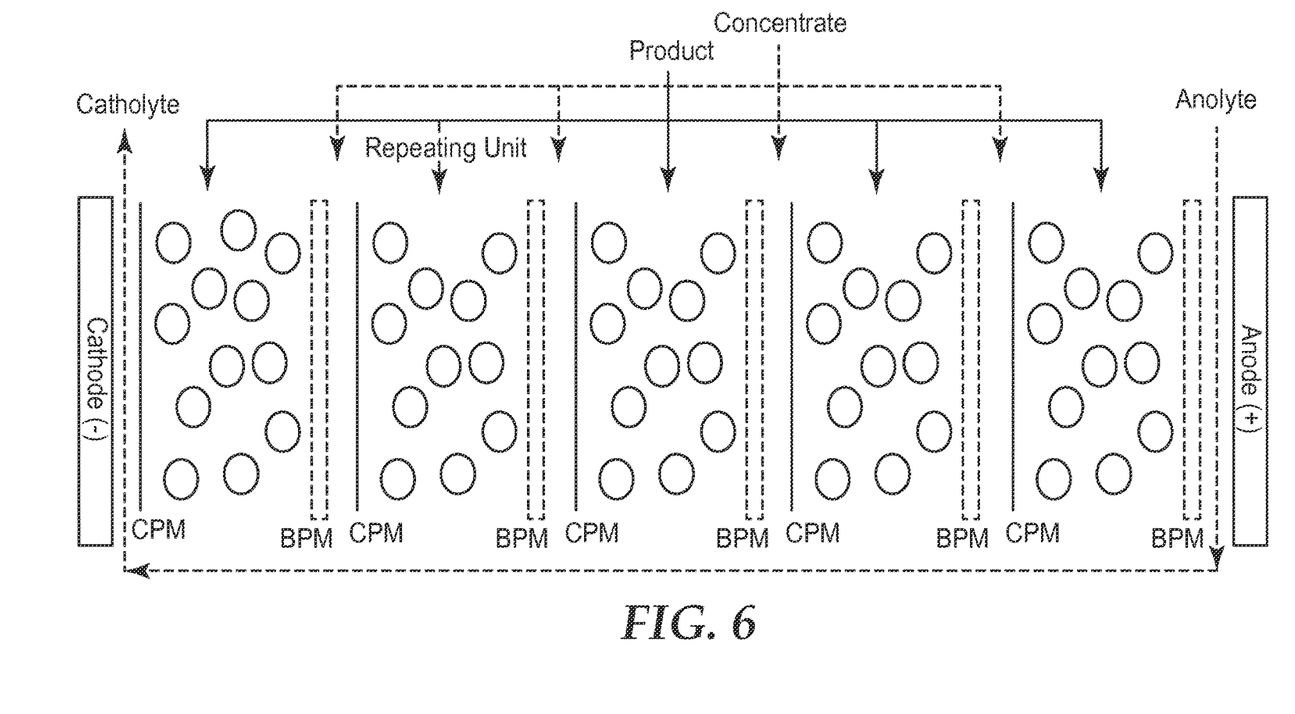
FIG. 6 is a schematic drawing of an embodiment of an electrochemical cell that is referred to as a 5-cell pair, meaning there are 5 sets of cation permeable and bipolar membranes.

A 5-cell pair ion exchange cell with bipolar membrane was built. FIG. 6 is a schematic drawing of an embodiment of a 5-cell pair electrochemical cell, meaning there are 5 sets of cation-permeable and bipolar membranes. The ion was a strong acid cation (SAC) resin. Each of the five product compartments contained 125 grams of strong acid cation resin (SAC, 8% cross link, in H+ form) per cell pair, with Excellion Cation and bipolar membranes.

The performance of this strong acid cation exchange cell with bipolar membrane (SAC Bipolar Cell) was evaluated with Meriden, Conn. City water during 2 service and 2 recharge cycles.

Service mode/cycle: 1 gallon of Meriden city water was passed through the product compartment of the SAC Bipolar Cell at 0.25 gpm. The runs are shown in Table 1.

Recharge mode/cycle: After the desired amount of water was processed in one service mode, spent resin was regenerated under a constant current density of 0.369 $mA/cm^2$. Target water was passed through the electrolyte compartments at 0.05 gpm, and the supply to all of the concentrate compartments was 0.1 gpm.

Service Mode

During the service mode, production of acidified water was demonstrated. This acid water can be used to flush ions in a waste stream of an ion reduction device. Table 1 provides the water pH at the inlet of the product compartment (as present in the city water) and the outlet of the product compartment (after having pass through the SAC resin). The acidic water has a pH that is sufficient to reduce scale or prevent precipitation of salts in one or more ion concentrate compartments.

TABLE 1

| pH | Run 1: 1 gallon | Run 2: 1 gallon |
|---|---|---|
| Inlet | 7.6 | 7.7 |
| Outlet | 3 | 3.1 |

LSI was calculated based on the information in Table 1 to compare hard water with the low pH acidic water produced by the SAC Bipolar Cell.

TABLE 2

| Water Quality | Hard water Comparative | Low pH |
|---|---|---|
| Hardness [ppm] | 300 | 300 |
| Alkalinity [ppm, $CaCO_3$] | 110 | 110 |
| TDS [ppm, $CaCO_3$] | 400 | 400 |
| pH | 8.3 | 3 |
| Temperature [° C.] | 20 | 20 |
| LSI | 0.1 | -4.52 |

Water at LSI<0 tends to be corrosive; at this low pH/low LSI, water will have the ability to remove scale by dissolving any calcium carbonate. This ability to dissolve calcium carbonate ($CaCO_3$) would not be expected from hard water having an LSI of, for example, 0.1.

Recharge Mode

During the recharge cycle, a voltage (at constant current density of 0.369 $mA/cm^2$) was applied to the cell. The recharge cycle was terminated when conductivity in the waste concentrate stream (outlet conductivity), which was a collection of the water from each individual concentrate compartment, was close to inlet conductivity or remained unchanged with time.

Figure 7:
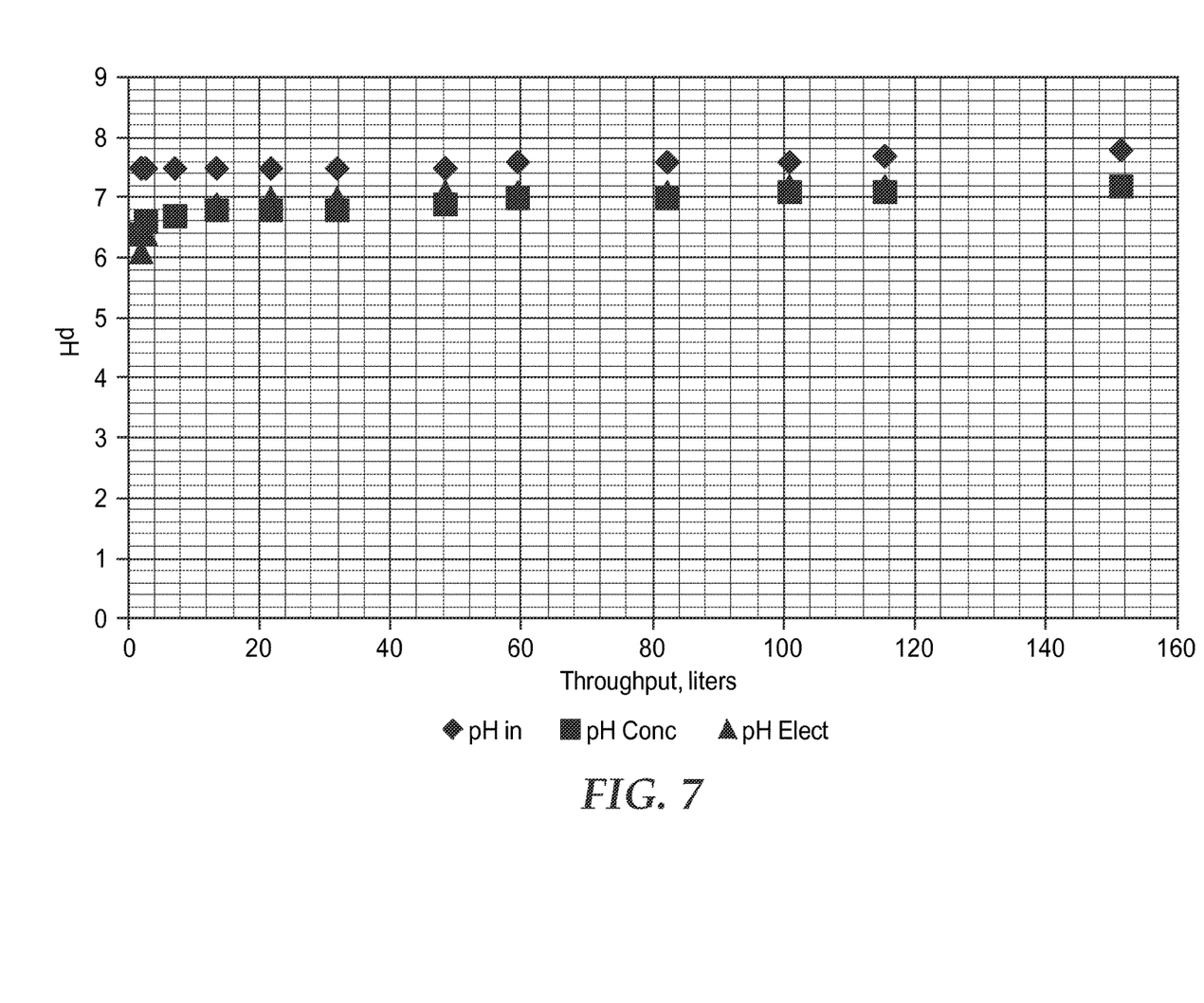
FIG. 7 is a graph of pH versus throughput of the waste water stream during a recharge mode using a strong acid cation exchange cell with bipolar membrane (SAC Bipolar Cell)
Figure 8:
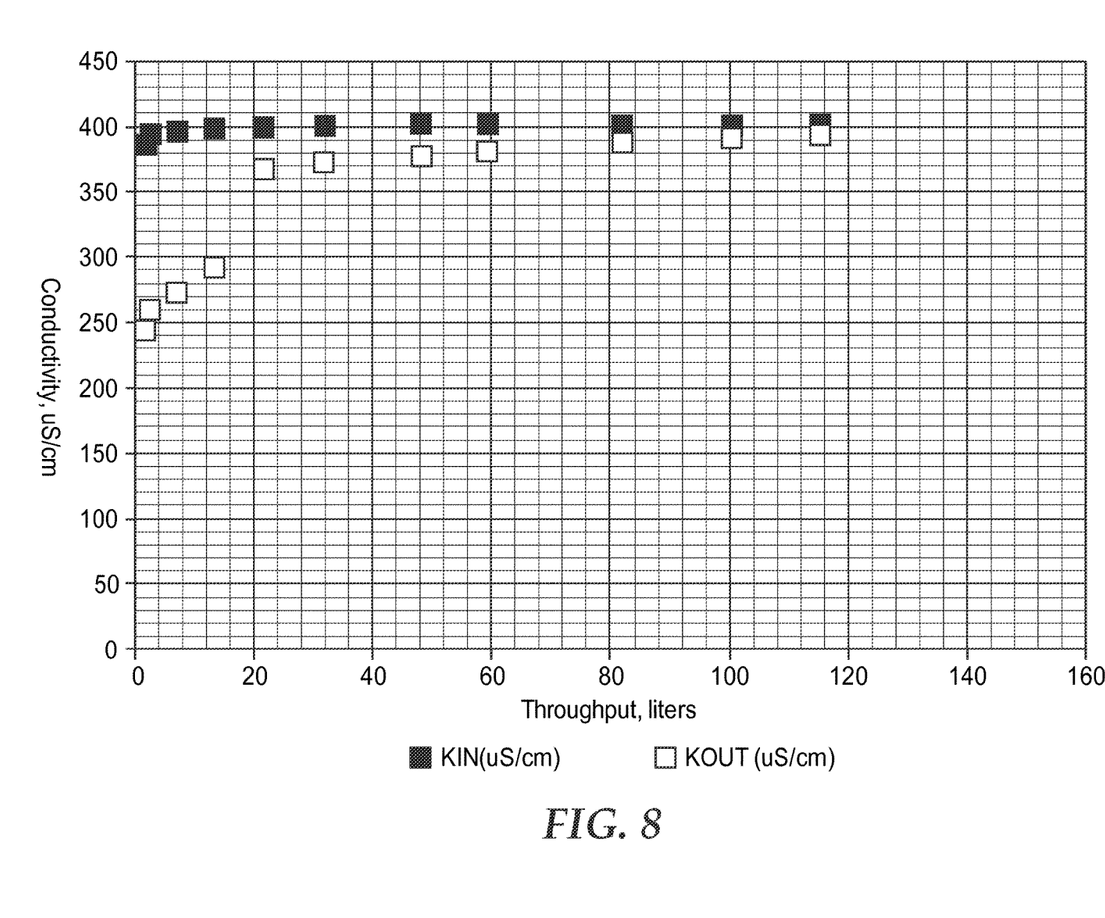
FIG. 8 is a graph of conductivity versus throughput during a recharge mode with a SAC Bipolar Cell.

FIG. 7 is pH versus throughput during a representative recharge cycle, where "pH in" refers to the pH of the water incoming to the concentrate compartments, "pH Conc." refers to the pH of the waste concentrate stream leaving the cell, and "pH Elect." refers to the pH of the stream leaving the electrolytes compartments. FIG. 8 shows conductivity versus throughput where KIN (µS/cm) refers to conductivity of incoming water and KOUT (µS/cm) refers to conductivity at the outlet of the concentrate compartments (collected into one waste concentrate stream).

Current Efficiency. Current efficiency is calculated based on total current passed during a recharge cycle (flow through concentrate compartments at 0.1 gpm, at constant current density of 0.369 $mA/cm^2$) and the current used for ion exchange obtained after recharge cycle. Table 3 shows current efficiencies of about 7% and 5%.

TABLE 3

| Recharge Cycle Total charge (C) | Service Mode (ppm of $CaCO_3$) | Current efficiency |
|---|---|---|
| 1: ~6000 | In: 140 Out: <20 Coulombs: 438 | ~7% |
| 2: ~9000 | In: 140 Out: <20 Coulombs: 438 | ~5% |

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The order of description of the above method should not be considered limiting, and methods may use the described operations out of order or with omissions or additions.

It is to be understood that the above description is intended to be illustrative, and not restrictive. Many other embodiments will be apparent to those of ordinary skill in the art upon reviewing the above description. The scope of the invention should, therefore, be determined with reference to the appended claims, along with the full scope of equivalents to which such claims are entitled.

What is claimed is:

1. A water treatment system comprising: an ion reduction device and an electrochemical cell in fluid communication with a waste stream of the ion reduction device, the electrochemical device supplying acid water to the waste stream to flush ions from an ion concentration compartment of the ion reduction device; and
wherein the ion reduction device further comprises: an inlet stream, an outlet stream; and a plurality of compartments each separated by an ion-permeable membrane, wherein each compartment comprises one or more deionized liquid compartments that receive the inlet stream and supply the outlet stream and one or more ion concentration compartments that are in fluid communication with the waste stream; and
the electrochemical cell has a service mode and a recharge mode, the electrochemical cell comprising:
a first product compartment containing a strong acid cation resin;
a first catholyte compartment and a first anolyte compartment;
a cation-permeable membrane and a bipolar membrane; and
a first cathode adjacent to the first catholyte compartment and an anode adjacent to the first anolyte compartment;
wherein during the service mode, water that is acidic flows from the product compartment into the waste stream of the ion reduction device.

2. The water treatment system of claim 1, wherein the waste stream comprises a recycle loop and a slip stream.

3. The water treatment system of claim 1, wherein the acidic water has a pH that is sufficient to reduce scale and/or prevent precipitation of salts in the one or more ion concentration compartments.

4. The water treatment system of claim 1, wherein the electrochemical cell is operated batch-wise and during the service mode no current density is applied to the electrochemical cell and during the recharge mode a current density is applied to the electrochemical cell.

5. The water treatment system of claim 4, wherein the current density is a low current density effective to substantially keep dissolved ions in solution in regions adjacent to the surfaces of the cation-permeable and bipolar membranes during the recharge mode.

6. The of water treatment system claim 1, wherein the electrochemical cell comprises two or more product compartments being separated by one or more concentrate compartments and containing strong cation resins, each product compartment bounded by a pair of cation-permeable and bipolar membranes.

7. The water treatment system of claim 1, wherein the electrochemical cell further comprises:
a second product compartment comprising a strong cation resin;
a second cathode adjacent to a second catholyte compartment that is adjacent to the second product compartment and a second anolyte compartment that is adjacent to the anode.

8. The water treatment system of claim 2, wherein the electrochemical cell further comprises a scale inhibition device.

9. The water treatment system of claim 8, wherein the scale inhibition device comprises a control system for applying the low current density to the electrochemical cell, for pulsing the low current density to the electrochemical cell, or both.

10. The water treatment system of claim 8, wherein the scale inhibition device comprises one or more fluid conveyance layers.

11. The water treatment system of claim 10, wherein the surfaces of the one or more fluid conveyance layers comprise non-smooth surface features.

12. A method of treating water comprising: operating an ion reduction device, flowing water through an electrochemical cell to produce acid water, supplying the acid water to a waste stream of the ion reduction device to flush ions from an ion concentration compartment of the ion reduction device; and wherein
the ion reduction device comprises:
an inlet stream, an outlet stream, and a waste stream;
a plurality of compartments each separated by an ion-permeable membrane, wherein each compartment comprises one or more deionized liquid compartments that receive the inlet stream and supply the outlet stream and one or more ion concentration compartments that are in fluid communication with the waste stream;
and the electrochemical cell has a service mode and a recharge mode, the electrochemical cell comprising:
a first product compartment containing a strong acid cation resin;
a first catholyte compartment and a first anolyte compartment;
a cation-permeable membrane and a bipolar membrane; and
a first cathode adjacent to the first catholyte compartment and an anode adjacent to the first anolyte compartment;
wherein acid water is produced from the product compartment during the service mode.

13. The method of claim 12, wherein the waste stream comprises a recycle loop and a slip stream and the acid water is provided to the recycle loop.

14. The method of claim 12, comprising reducing scale and/or preventing precipitation of salts in the one or more ion concentration compartments.

15. The method of claim 12, wherein the step of providing the acid water to the waste stream occurs at intervals based on time, quality of the waste stream, or combinations thereof.

16. The method of claim 12, further comprising ceasing supplying the acid water to the waste stream at intervals based on time, quality of the waste stream, or combinations thereof.

17. The method of claim 15, wherein the quality of the waste stream comprises conductivity, pH, total dissolved solids, LSI (Langelier Saturation Index), temperature, or combinations thereof.

18. The method of claim 16, wherein the quality of the waste stream comprises conductivity, pH, total dissolved solids, LSI (Langelier Saturation Index), temperature, or combinations thereof.

19. The method of claim 12, wherein the electrochemical cell is operated batch-wise, and during the service mode no current density is applied to the electrochemical cell during the recharge mode a current density is applied to the electrochemical cell.

20. The method of claim 19, wherein the current density is a low current density is effective to substantially keep dissolved ions in solution in regions adjacent to the surfaces of the cation-permeable and bipolar membranes during the recharge mode.

21. The method of claim 19, wherein during the service mode where no current density is applied to the electrochemical cell, the water passes through the first product compartment and contacts the strong acid cation resin, exiting the first product compartment in an acidic form; and wherein during the recharge mode where the current density is applied to the electrochemical cell, a concentrate stream enters the first catholyte and the first anolyte compartments and contacts the cation-permeable and the bipolar membranes, exiting first catholyte and the first anolyte compartments with an increased amount of ions as compared to when the concentrate stream entered the first catholyte and the first anolyte compartments, and after the recharge mode, the strong acid cation resin has fewer ions as compared to when the recharge mode started.

22. The method of claim 19, wherein the electrochemical cell comprises two or more product compartments being separated by one or more concentrate compartments and containing strong cation resins, each product compartment bounded by a pair of cation-permeable and bipolar membranes;
wherein during the service mode where no current density is applied to the electrochemical cell, the water passes through the two or more product compartments and contacts the strong acid cation resins, exiting the product compartments in an acidic form; and
wherein during the recharge mode where the current density is applied to the electrochemical cell, a concentrate stream enters the first catholyte, the first anolyte compartment, and the one or more concentrate compartments and contacts the cation-permeable membranes and the bipolar membranes, exiting first catholyte, the first anolyte, and the one or more concentrate compartments with an increased amount of ions as compared to when the concentrate stream entered the first catholyte, the first anolyte, and the one or more concentrate compartments, and after the recharge mode, the strong acid cation resins have fewer ions as compared to when the recharge mode started.

23. The method of claim 12, wherein the method excludes the use of chemical additions to the electrochemical cell.

* * * * *

UNITED STATES PATENT AND TRADEMARK OFFICE
CERTIFICATE OF CORRECTION

PATENT NO. : 10,131,553 B2  
APPLICATION NO. : 14/648808  
DATED : November 20, 2018  
INVENTOR(S) : Robert Astle Page 1 of 1

It is certified that error appears in the above-identified patent and that said Letters Patent is hereby corrected as shown below:

On the Title Page

<u>In Column 2, under the Section entitled (Abstract)</u>  
Line 3, delete "electro-chemical" and insert -- electrochemical --, therefor.  
Line 7, after "it" insert -- is --.

In the Claims

<u>Column 10</u>  
Line 65, in Claim 1, delete "of water treatment system" and insert -- water treatment system of --, therefor.

Signed and Sealed this  
Twenty-sixth Day of February, 2019

Andrei Iancu  
*Director of the United States Patent and Trademark Office*